United States Patent [19]

Probst et al.

[11] 4,418,175

[45] Nov. 29, 1983

[54] CATIONIC SIZING AGENTS FOR PAPER

[75] Inventors: Joachim Probst, Cologne; Günter Kolb, Leverkusen; Friedhelm Müller, Odenthal; Heinz Bäumgen, Leverkusen, all of Fed. Rep. of Germany

[73] Assignee: Bayer Aktiengesellschaft, Leverkusen, Fed. Rep. of Germany

[21] Appl. No.: 329,721

[22] Filed: Dec. 11, 1981

Related U.S. Application Data

[62] Division of Ser. No. 226,866, Jan. 21, 1981, abandoned.

[30] Foreign Application Priority Data

Jan. 25, 1980 [DE] Fed. Rep. of Germany ....... 3002687

[51] Int. Cl.$^3$ ............................................. C08F 220/46
[52] U.S. Cl. ..................................... 524/555; 526/312; 525/328.2
[58] Field of Search ................. 524/555; 526/292, 312; 525/328.2

[56] References Cited

U.S. PATENT DOCUMENTS

| | | | |
|---|---|---|---|
| 2,838,397 | 6/1958 | Groutfest et al. | 92/21 |
| 2,964,445 | 12/1960 | Daniel, Jr. | 162/168 |
| 4,170,672 | 10/1979 | Moriya et al. | 524/555 |

*Primary Examiner*—Joseph L. Schofer
*Assistant Examiner*—Bernard Lipman
*Attorney, Agent, or Firm*—Connolly and Hutz

[57] ABSTRACT

The aqueous solution of a statistical terpolymer containing quaternized amino groups and having a regular chemical structure of
  (a) from 8 to 20%, by weight, of N,N-dimethylaminoethyl acrylate and/or N,N-dimethylaminoethyl methacrylate;
  (b) from 45 to 80%, by weight, of styrene; and
  (c) from 8 to 35%, by weight, of acrylonitrile;
the sum of (a) to (c) being 100%, by weight, and at least 10% of the dimethylamino groups of the terpolymer being quaternized and the remainder protonated is suitable as cationic paper sizing agent.

4 Claims, 1 Drawing Figure

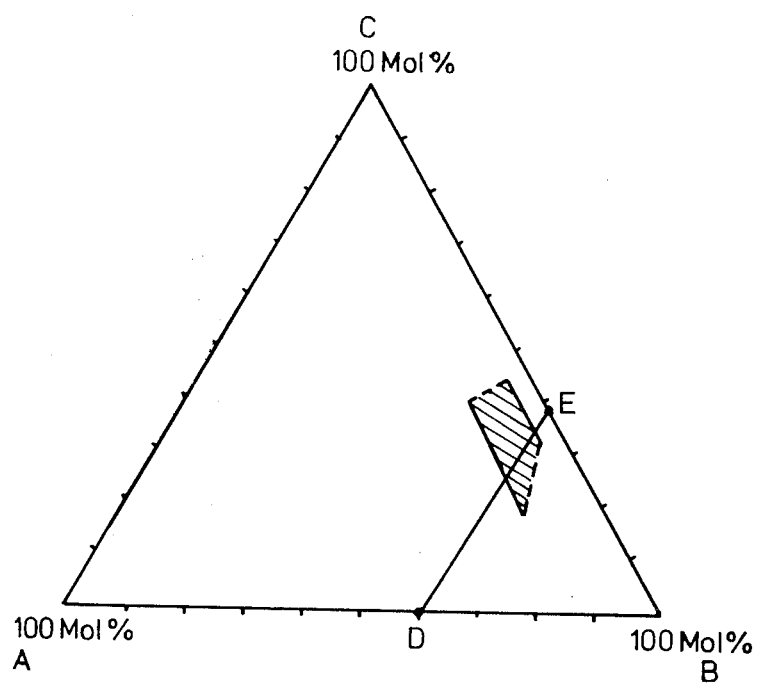

CATIONIC SIZING AGENTS FOR PAPER

CROSS REFERENCE TO RELATED APPLICATION

This application is a division of application Ser. No. 226,866 filed Jan. 21, 1981 and now abandoned.

This invention relates to paper sizing agents based on terpolymers of styrene, acrylonitrile and N,N-dimethylaminoethyl (meth)acrylate which have been converted into catonic water-soluble polymers by reaction with quaternising agents and acids.

U.S. Pat. No. 2,964,445 describes the copolymerisation of hydrophobic monomers, such as styrene or substituted styrenes or esters of acrylic or methacrylic acids, with monomers having hydrophilic properties, such as vinyl pyridines, N,N-dimethylaminoethyl(meth)acrylate and 2-dimethylamino-1-methylethyl(meth)acrylate, as well as N,N-dimethylaminoethyl acrylamide. The basic groups present in the copolymer are converted into water-soluble salts by quaternisation using conventional quaternising agents or by reaction with organic or inorganic acids. For example, a bulk copolymerisation reaction is described in which 23%, by weight, of N,N-dimethylaminoethyl methacrylate and 77%, by weight, of styrene are used. After quaternisation with benzyl chloride, an aqueous partial dispersion is obtained in which most of the polymer is present in dissolved form. By contrast, where quantities smaller than about 20%, by weight, of N,N-dimethlaminoethyl methacrylate of acrylate are used in the copolymer, the dispersed component steadily increases in the relation to the genuinely dissolved component. Such partial dispersions are also described in German Offenlegungsschrift Nos. 1,546,236; 2,356,296 and 2,519,581.

Where the copolymer contains more than about 20%, by weight, of N,N-dimethylaminoethyl(meth)acrylate, these partial dispersions, which generally contain styrene as the hydrophobic constituent, are relatively stable. However, below 20%, by weight, of copolymerised tertiary amino compound, they very quickly lose stability, in other words polymer deposits occur and may give rise to a considerable deterioration in the sizing effect and to disturbances in the paper making process. In addition, partial dispersions of the type in question are generally not stable to freezing and thawing, i.e. after freezing and thawing, for example during storage, the sizing effect partly or completely disappears. In addition, partial dispersions of the type in question may lead to foaming during processing which interferes with the paper making process and may lead to unevenly sized papers. The pH-stability of these sizing agents is also inadequate in many cases. Even at pH values of from 7 to 7.5, the sizing effect disappears almost completely.

It has now been found that statistical terpolymers having a very regular chemical structure of N,N-dimethylaminoethyl(meth)acrylate, styrene and acrylontrile, the amino groups of which have been completely converted into ammonium groups, represent sizing agents for paper which, for N,N-dimethylamioethyl(meth)acrylate contents in the copolymer of up to 20%, by weight, form pH-stable non-foaming solutions which are resistant to shearing and unaffected by freezing and thawing. The terpolymers are at least partly quaternised by conventional quaternising agents and dissolved with organic or inorganic acids in aqueous medium.

The present invention relates to cationic sizing agents for paper in the form of an aqueous solution of a statistical terpolymer containing quaternary ammonium groups and having a chemically regular structure of:

(a) from 8 to 20%, by weight, of N,N-dimethylaminoethyl acrylate and/or methacrylate;

(b) from 45 to 80%, by weight, preferably from 55 to 75%, by weight, of styrene; and (c) from 8 to 35%, by weight, preferably from 10 to 30%, by weight, of acrylonitrile;

the sum of components (a) to (c) being 100%, by weight, and at least 10% of the N,N-dimethylamino groups of the terpolymer being quaternised and the rest protonated.

The structure of chemically regular terpolymers is achieved by selecting the comonomer ratio of styrene to acrylonitrile in the monomer mixture, for a predetermined content of N,N-dimethylaminoethyl(meth)acrylate, in such a way that the composition of the monomer mixture lies in the range between the compositions of the two binary azeotropes N,N-dimethylaminoethyl(meth)acrylate/styrene and styrene/acrylonitrile. The appropriate range may readily be determined by means of a system of triangular coordinates and is selected in such a way that the composition of the monomer mixture lies in the vicinity of or on the connecting line between the above-mentioned binary azeotropes.

FIG. 1 shows one such system of coordinates of which the corners A, B and C respectively correspond to 100 mole percent of N,N-dimethylaminoethylmethacrylate, styrene and acrylonitrile. The connecting line shown runs between point D, which corresponds to the binary azetrope of N,N-dimethylaminoethyl methacrylate and styrene, and point E, which corresponds to the binary azeotrope of acrylonitrile and styrene.

The preferred quantitative ratios of styrene and acrylonitrile for a predetermined content of N,N-dimethylaminoethyl methacrylate, for example, are shown in Table 1. This preferred range is also shown in the FIG. 1.

TABLE 1

Composition of the monomer mixtures for a predetermined content of N,N—dimethylaminoethyl methacrylate

| N—dimethylaminoethyl methacrylate content (%, by weight) | Styrene content (% by weight) | Acrylonitrile content (%, by weight) |
|---|---|---|
| 8 | 64–73 | 19–28 |
| 9 | 63–73 | 18–28 |
| 10 | 62–72 | 18–28 |
| 11 | 61–72 | 17–28 |
| 12 | 60–72 | 16–28 |
| 13 | 60–71.5 | 15.5–27 |
| 14 | 60–71 | 15–26 |
| 15 | 60–71 | 14–25 |
| 16 | 59–70 | 14–25 |
| 17 | 59–70 | 13–24 |
| 18 | 58–70 | 12–24 |
| 19 | 57–70 | 11–24 |
| 20 | 56–70 | 10–24 |

The copolymerisation reaction may be carried out in bulk, emulsion or, preferably, in solution and both in batches and also continuously or by the monomer feed process. Continuous and monomer feed processes are particularly preferred. In the monomer feed process, the solvent is initially introduced, heated to the polymerisation temperature and the mixture of the three monomers added dropwise to the solvent at the same time as the initiator. After a while, the reaction is reactivated and continued to a conversion of from about 99.0 to 99.9%.

The polymerisation temperatures may be from 50° to 150° C., preferably from 60° to 100° C. They are of course dependent upon the type of initiator used and its half-life.

Suitable initiators are the radical-yielding compounds normally used for polymerisation reactions, for example azo-compounds, such as azoisobutyronitrile, or peroxides, such as t-butyl perpivalate, t-butyl-per-2-ethyl hexanoate, benzoyl peroxide, t-butyl perbenzoate, di-t-butyl peroxide and cumene hydroperoxide. They are used in quantities of from 0.1 to 6%, by weight, based on the initial monomer mixture. Quantities of from 0.5 to 4%, by weight, are preferred.

Water-miscible and water-immiscible organic solvents may be used as the reaction medium for solution polymerisation. Water-miscible solvents are, for example, alcohols, such as ethanol and isopropanol, ketones, such as acetone and ethyl methyl ketone, esters, such as methyl glycol acetate, as well as dioxane and N,N-dimethyl formamide; water-immiscible solvents are, for example, aromatic hydrocarbons, such as benzene, toluene and xylene. It is preferred to use water-miscible solvents.

In order to introduce as little solvent as possible into the final aqueous solution, it is advisable to carry out polymerisation in a high solution concentration of the order of from 50 to 80%, by weight, based on the final polymer.

Using such high concentrations, highly viscous polymer solutions are formed. In some cases, the polymers accumulate in heavily swollen form during the actual polymerisation reaction or are precipitated on account of the poor solubility thereof.

The statistical terpolymers according to the present invention have a highly regular chemical structure, in other words the monomers are incorporated in substantially constant quantitative ratios during the polymerisation reaction. As shown in Example 3 herein, this may be confirmed both by the analysis of samples taken during the polymerisation reaction and also by simulating the course of polymerisation by computer program.

The average molecular weights of these terpolymers are from 3000 to 100,000, which may be determined by gel permeation chromatography (GPC) using the method developed by Benoit et al. (J. Polymer Sci., Part B, Polymer Letters 5 (1967) page 753) or, in the case of molecular weights below 15,000, by vapour pressure osmometry. The average molecular weights $M_{GPC}$ are preferably from 10,000 to 70,000 and the intrinsic viscosities from about 0,08 to 0.60 dl/g, as measured in tetrahydrofuran. Terpolymers having intrinsic viscosities below 0.08 dl/g give less effective sizing agents, while terpolymers having higher intrinsic viscosity than 0.60 dl/g show excessive solution viscosities. The dishomogeneity factors $U=(Mw/Mn)-1$ are from 0.5 to 2.5, which again may be estimated from GPC measurements. This low molecular dishomogeneity is attributable inter alia to the minimal chemical heterogeneity of the terpolymers.

After polymerisation, the N,N-dimethylamino groups are quaternised, advantageously in the organic solvent which has been used for polymerisation. Suitable quaternising agents are, for example, alkyl and aralkyl halides, such as methyl chloride, methyl bromide, butyl bromide and benzyl chloride, other halogen compounds, such as propargyl chloride, allyl chloride and chloroacetic acid ethyl ester, epihalohydrins, such as epichlorohydrin, epibromohydrin and methyl epichlorohydrin, as well as esters suitable for use as alkylating agents, such as dimethyl sulphate and p-toluene sulphonic acid methyl ester. It is also possible to use mixtures of these quaternising agents. It is preferred to use epihalohydrins, particularly epichlorohydrin.

Quaternisation improves the sizing effect and considerably increases the stability of the solutions to changes in pH. While, for example, non-quaternised cationic surface sizing agents based on N,N-dimethylaminoethyl(meth)acrylate/styrene/acrylonitrile, which have only been reacted with acids, lose the sizing effect thereof at pH values of about 7.5 and higher, pH-stabilizers up to pH 8 to 9 and, in the case of epichlorohydrin, even up to pH 10 are obtained using the polycations quaternised in accordance with the present invention.

The quaternising agents are added to the polymer solutions in such quantities that there are from 0.3 to 2,0 moles of quaternising agent per mole of amino group. Molar ratios of from 1:0.5 to 1:1.2 (amino group:quaternising agent) are preferred. The quaternisation reactions are carried out at temperatures of from 25° to 120° C., preferably from 40° to 70° C. The degree of quaternisation, i.e. the proportion of quaternised amine in relation to all the amino groups present, is from 10 to 100%. The reaction times range from 0.5 to 10 hours.

The degree of quaternisation and the reaction time are particularly low and short, respectively, in the case of epichlorohydrin where a degree of quaternisation of 40% is generally not exceeded, as may be shown by determining the chlorine present in the polymer precipitated and by titrating the non-quaternised amine groups. If the reaction with epichlorohydrin is taken any further, the terpolymer may gel. This gelation may be prevented by adding acid at the right time.

U.S. Pat. No. 3,694,393 describes quaternisation with epichlorohydrin in aqueous medium after the acidification of polyamines of (meth)acrylates and N,N-dimethylaminoethyl methacrylate. The quaternisation reaction takes place at room temperature, lasts a very long time and is required to load to high degrees of quaternisation of the order of 90% to ensure that good sizing effects are obtained. German Offenlegungsschrift No. 2,216,458 also describes quaternisation reactions in aqueous-acid medium at temperatures of the order of 80° C. These reactions also generally last for several hours and the conversions are also very high.

According to the present invention, however, quaternisation with epichlorohydrin is carried out in organic medium under much milder conditions (from 25° to 50° C.) and in considerably shorter times (from 0.25 to 2 hours). The degrees of quaternisation amount to from about 10 to 40%, i.e. are not as high as those mentioned above, but give sizing effects which are at least as good.

In order to obtain sizing agents which are readily soluble in water and in order to protonate amino groups which are still free after incomplete quaternisation, water-soluble organic or inorganic acids are added. Suitable acids include formic acid, acetic acid, propionic acid, lactic acid, hydrochloric acid, nitric acid, sulphuric acid and phosphoric acid. Formic acid, acetic acid and hydrochloric acid are particularly preferred. The acids are added in quantities of from 50 to 500 mole percent, based on the tertiary amino groups bound in the polymer. It is preferred to use from 100 to 300 mole percent of acid. Where epichlorohydrin is used as the quaternising agent, polyaddition reactions and gelation reactions resulting therefrom are simultaneously terminated by this addition of acid.

Water is generally used as solvent for the sizing agent. After the polycation has been dissolved therein, from about 10 to 30%, by weight, preferably from 15 to 25%, by weight, solutions are obtained. The water-miscible organic solvents still present therein may remain in the solution. However, they may also be removed together with the residual monomers, styrene and acrylonitrile, by distillation under a slight vacuum. In this connection, it is advantageous to use water-miscible solvents the boiling points of which are lower than that of water. In this case, the organic solvent may be almost quantitatively removed.

In the case of water-immiscible solvents, such as aromatic hydrocarbons, it is advisable to remove them by steam distillation after quaternisation and then to react the polymer with acid.

The surface sizing agents for paper according to the present invention may be used by various of the methods normally used for surface pulp sizing in paper making.

The advantages over a conventional commercial sizing agent of the type described in German Offenlegungsschrift No. 1,621,688 (a relatively unstable latex) are pH-stability, thermal stability, resistance to shearing and to freezing and thawing, coupled with the extremely low tendency towards foaming.

In contrast to the dispersions according to German Offenlegungsschrift No. 1,621,688, the homogeneous aqueous solutions of the cationic sizing agents according to the present invention may be processed without problems. Unlike heterogenous sizing systems, they guarantee absolute homogeneity of the sized paper. They show a good to outstanding sizing effect on virtually any paper, the sizing of paper free from aluminium sulphate being particularly emphasised. In this connection, the excellent sizing of chalk-containing paper deserves particular mention.

EXAMPLES

EXAMPLES 1 to 4

Polymerisation 5720 g of isopropanol are introduced into a 40-liter stirrer-equipped autoclave. The autoclave is thoroughly purged with nitrogen and then heated to 80° C.

When this temperature is reached, mixtures I and solutions II as shown in Table 2 are added over a period of about 4 hours in the absence of air. After stirring for from 1 to 2 hours, polymerisation is reactivated with III (cf. Table 2). The polymerisation mixtures are then stirred at 80° C. for about 8 to 12 hours.

TABLE 2

| Example No. | 1 | 2 | 3 | 4 |
|---|---|---|---|---|
| I. N,N—dimethyl-aminoethyl methacrylate [g] | 3217 | 2573 | 2257 | 1592 |
| styrene [g] | 10224 | 10455 | 10608 | 11119 |
| acrylonitrile [g] | 2644 | 3056 | 3219 | 3374 |
| II. azoisobutyronitrile [g] | 530 | 550 | 600 | 500 |
| acetone [g] | 3000 | 2500 | 3000 | 3000 |
| III. t-butyl-per-2-ethyl hexanoate [g] | 100 | — | 100 | 119 |
| azoisobutyronitrile [g] | — | 75 | — | — |
| acetone [g] | — | 300 | — | — |

The regular structure of the polymers may be observed by taking samples during polymerisation. The samples are precipitated with precipitants, dried and analysed. This is preferably done by elemental analysis or, after calibration, by IR-spectrometry (cf. Table 3).

The average composition observed is a value obtained by summation which may be confirmed by computer simulation. In addition, the computer calculation gives the actual chemical distribution as an integral frequency distribution in the form of the composition momentarily developing at the particular conversion.

TABLE 3

Chemical heterogeneity of the terpolymer according to Example 3 of 14.0%, by weight, of N,N—dimethylaminoethyl methacrylate, 66.0% of styrene and 20.0% of acrylonitrile

| Conversion [%, by weight] | N,N—dimethylaminoethyl methacrylate content [%, by weight] calculated | | | Styrene content [%, by weight] calculated | | | Acrylonitrile content [%, by weight] calculated | | |
|---|---|---|---|---|---|---|---|---|---|
| | obs. | mean | mom. | obs. | mean | mom. | obs. | mean | mom. |
| 2.7 | 15.2 | 13.7 | 13.7 | 66.7 | 66.9 | 66.8 | 18.1 | 19.4 | 19.5 |
| 5.6 | 14.7 | 13.7 | 13.7 | 66.6 | 66.8 | 66.8 | 18.7 | 19.5 | 19.5 |
| 7.4 | 14.3 | 13.7 | 13.7 | 66.2 | 66.8 | 66.7 | 19.5 | 19.5 | 19.6 |
| 15.6 | 14.7 | 13.7 | 13.8 | 66.8 | 66.7 | 66.6 | 18.5 | 19.6 | 19.6 |
| 35.8 | 14.5 | 13.8 | 13.9 | 66.0 | 66.6 | 66.3 | 19.5 | 19.6 | 19.8 |
| 56.4 | 15.2 | 13.9 | 14.0 | 65.0 | 66.4 | 66.0 | 19.8 | 19.7 | 20.0 |
| 94.8 | 14.7 | 14.0 | 14.3 | 65.7 | 66.1 | 65.2 | 19.6 | 19.9 | 20.5 |

Quaternisation and conversion into an aqueous solution

After polymerisation, the reaction mixture is cooled to 40° C. and epichlorhydrin is added in the quantities indicated in Table 4. After stirring for 1 hour at 40° C., acetic acid is added in the quantitities indicated in Table 4. From about 63 to 65 liters of deionised water at a temperature of from about 50° to 60° C. are introduced into a 120 liter storage vessel equipped with a stirrer, after which the contents of the 40 liter autoclave are combined therewith. A homogeneous aqueous solution is soon obtained by intensive stirring. The aqueous solutions have the properties shown in Table 4.

TABLE 4

| Example No. | 1 | 2 | 3 | 4 |
|---|---|---|---|---|
| IV. epichlorhydrin [g] | 1896 | 1516 | 1330 | 938 |
| V. acetic acid [g] | 2360 | 3300 | 2630 | 2375 |
| concentration [%, by weight] | 22.6 | 19.5 | 20.3 | 20.5 |
| viscosity (at 20° C.) [mPa · s]* | 120–170 | — | 880–1200 | 400–480 |
| pH | 3.9 | 3.4 | 3.8 | 3.8 |
| conversion, based on monomer [%, by weight] | 99.8 | 99.9 | 99.7 | 99.8 |
| degree of quaternisation [%] | 20 | 25 | 25 | 28 |
| appearance of the solution | clear | clear | clear | slightly hazy |

*The viscosity η is not a constant because it expresses the viscosity of a non-Newtonion liquid.

EXAMPLES 5 to 8

The terpolymer of Examples 5 to 8 is produced in the same way as described in Example 1.

The reaction mixtures are then cooled to the temperatures indicated in Table 5, the quaternising agents indicated in Table 5 are then added in the quantities specified and the mixture left to react for from 4 to 6 hours. Subsequent dissolution with 2375 g of acetic acid in from 62 to 68 liters of deionised water is carried out in the same way as in Examples 1 to 4.

TABLE 5

| Example No. | 5 | 6 | 7 | 8 |
|---|---|---|---|---|
| Quaternising agents: | | | | |
| dimethyl sulphate [g] | 1306 | | | |
| p-toluene sulphonic acid methyl ester [g] | | 1555 | | |
| chloroacetic acid ethyl ester [g] | | | 1887 | |
| allyl chloride [g] | | | | 783 |
| reaction temperature [°C.] | 60 | 60 | 50 | 50 |
| concentration [%, by weight] | 14.7 | 19.4 | 18.8 | 19.9 |
| viscosity (at 20° C.) [mPa · s]* | 850–1400 | 1050–1380 | 1100–1400 | 1100–1400 |
| pH | 2.6 | 2.7 | 3.6 | 4.0 |
| conversion, based on monomer [%, by weight] | 99.8 | 99.7 | 99.9 | 99.9 |
| degree of quaternisation [%] | 50 | 40 | 50 | 50 |
| appearance of the solution | clear | clear | clear | clear |

*The viscosity η is not a constant because it expresses the viscosity of a non-Newtonion liquid.

In Examples 1 to 8 according to the present invention, clear aqueous sizing agents solutions are obtained and, even after the organic solvents, isopropanol and acetone, have been distilled off, show only slight clouding.

COMPARISON EXAMPLES 9 to 12

The object of Comparison Examples 9 to 12 is to show that terpolymers having a composition which does not lie within the range indicated in Table 1 are capable of forming partial dispersions with a tendency towards instability which may lead to deposits.

Polymerisation 105 g of isopropanol are introduced into a two-liter flask thoroughly purged with nitrogen and equipped with an effective stirrer, a dropping funnel and a nitrogen inlet. After heating to from about 80° to 85° C., the quantities of monomers and initiator indicated in Table 6 are added dropwise over a period of 2 hours. After stirring for about 2 hours, polymerisation is reactivated by the addition of 2 g of t-butyl-per-2-ethyl hexanoate, followed by stirring for 10 hours at from 80° to 85° C. 30 g of formic acid and from 0.9 to 1.1 liters of deionised water are then added and the terpolymer dissolved therein. The solution properties indicated in Table 6 are obtained.

TABLE 6

| Example No. | 9 | 10 | 11 | 12 |
|---|---|---|---|---|
| N,N—dimethylaminoethyl methacrylate [g] | 48.2 | 42.7 | 37.4 | 32.1 |
| Styrene [g] | 188.3 | 188.5 | 192.9 | 197.4 |
| acrylonitrile [g] | 30.6 | 35.9 | 36.8 | 37.6 |
| azoisobutyronitrile [g] | 10 | 10 | 10 | 10 |
| concentrations [%, by weight] | 18.1 | 18.0 | 19.6 | 21.7 |
| viscosity (at 20° C.)* [mPa · s] | 1800–7600 | 2300–3200 | 102–105 | 500–1600 |
| pH | 3.4 | 3.3 | 3.2 | 3.2 |
| appearance of the solution | slightly cloudy | cloudy | cloudy (after a few days sediment) | very cloudy (deposition) |

*The viscosity η is not a constant because it expresses the viscosity of a non-Newtonion liquid.

Examples 9 to 12 demonstrate that it is more critical to maintain the monomer composition according to Table 1, the smaller the proportion of N,N-dimethylaminoethyl methacrylate in the monomer mixture. If the organic solvent, isopropanol, is distilled off, the solutions of Examples 9 to 12 cloud to even greater extent. In the case of Example 10, some sediment also appears after a few days.

The use of the sizing agents described above is illustrated in the following.

A solution of 5%, by weight, of starch (Perfectamyl ®A 4692, a product of the AVEBE Company) and 0.25 or 0.5%, by weight, of the sizing agent to be tested (expressed as active substance) in 94.75 or 94.5%, by weight, of water is used as the sizing solution for surface sizing.

A type HF laboratory sizing press (manufactured by Messrs. Werner Mathis, Zurich) is used for sizing. The sizing solution has a temperature of about 20° C. in the sizing press. The paper is drawn through at a rate of 4 meters per minute.

The surface-sized papers are dried on a drying cylinder over a period of about 45 seconds at a temperature of about 100° C. Before the sizing test, the papers are conditioned for 2 hours at room temperature. Pieces of the papers are then pre-weighed, immersed for 1 minute in water at 20° C., pressed once between filter papers using a 10 kg rolling weight and then re-weighed.

The value for the uptake of water on both sides is calculated in g/m$^2$ from the difference in weight. The lower the water uptake, the better the effect of the tested sizing agent. The sizing effect is good where the water uptake is of the order of 40 g/m$^2$ or less.

APPLICATION EXAMPLE 1

This example demonstrates the effectiveness of a few sizing agents on paper free from aluminium sulphate.

The untreated paper used has the following composition and properties: 50%, by weight, of conifer cellulose, 50%, by weight, of hardwood cellulose; 9.5%, by weight, of clay ash, pH in the breast box: 7.5; wet uptake in the laboratory sizing press: approximately 80%, by weight; weight of paper: 80 g/m$^2$.

TABLE 7

Surface sizing on paper free from aluminium sulphate

| | water uptake in g/m$^2$ after the addition of | |
|---|---|---|
| Sizing agent: | 0.25%, by weight, of sizing agent (based on pure active substance) to the solution: | 0.5%, by weight, |
| 1 | 36.4 | 31.1 |
| 2 | 34.0 | 31.4 |
| 3 | 31.3 | 31.2 |
| 4 | 33.0 | 30.2 |
| 7 | 37.6 | 32.5 |

In the absence of sizing agent, the water uptake amounts to 89.0 g/m$^2$.

APPLICATION EXAMPLE 2

This Example demonstrates the effectiveness of a few sizing agents on paper containing mechanical wood pulp.

The composition and properties of this paper were as follows:

40%, by weight, of conifer cellulose, 60%, by weight, of mechanical wood pulp; 14.1%, by weight, of clay ash, 2%, by weight, of aluminium sulphate; pH in the breast box: 4.5; wet uptake: approximately 60%, by weight; weight of paper: approximately 80 g/cm².

TABLE 8

Surface sizing on paper containing mechanical wood pulp

| Sizing agent: | water uptake in g/m² after the addition of | |
|---|---|---|
| | 0.25%, by weight, of sizing agent (based on pure active substance) to the solution: | 0.5%, by weight, |
| 1 | 38.7 | 30.4 |
| 2 | 34.6 | 30.8 |
| 3 | 35.3 | 30.8 |
| 4 | 30.9 | 28.3 |
| 7 | 39.8 | 32.1 |

In the absence of sizing agent, the water uptake amounts to 93.5 g/m².

APPLICATION EXAMPLE 3

This Example demonstrates the effectiveness of the described sizing agents on paper containing calcium carbonate. Composition and properties of the paper: 50%, by weight, of conifer cellulose, 50%, by weight, of hardwood cellulose; 7.9%, by weight, of chalk ash, pH in the breast box: 7.5; wet uptake: approximately 80%, by weight; weight of paper: 75 g/m².

TABLE 9

Surface sizing on paper containing calcium carbonate

| Sizing agent: | water uptake in g/m² after the addition of | |
|---|---|---|
| | 0.25%, by weight, of sizing agent (based on pure active substance) to the solution | 0.5%, by weight, |
| 1 | 37.2 | 34.7 |
| 2 | 38.2 | 33.7 |
| 3 | 33.9 | 32.4 |
| 4 | 32.9 | 32.1 |
| 7 | 38.1 | 34.2 |

In the absence of sizing agent, the water uptake amounts to 78.7 g/m².

APPLICATION EXAMPLE 4

In this Example, sizing agents 1 to 4 are compared with a conventional commercial cationic "sizing agent K" according to DT-OS No. 1,621,688 for the pH-independent sizing effect thereof.

The untreated paper described in Application Example 1 is used for this purpose. Once again, the water uptake on both sides is measured both at the spontaneously adjusted pH (from 5.9 to 6.2) and also at a pH of 8.0 in the solution. The degree of sizing is measured after the addition of 0.25%, by weight, of active substance to the solution.

TABLE 10

Surface sizing in dependence upon the pH of the solution by comparison with a conventional commercial sizing agent K

| Sizing agent | Water uptake in g/m² at | |
|---|---|---|
| | pH 5.9–6.2 | pH 8.0 |
| K | 32.1 | 56.0 |
| 1 | 31.3 | 30.4 |
| 2 | 35.0 | 32.1 |

TABLE 10-continued

Surface sizing in dependence upon the pH of the solution by comparison with a conventional commercial sizing agent K

| Sizing agent | Water uptake in g/m² at | |
|---|---|---|
| | pH 5.9–6.2 | pH 8.0 |
| 3 | 30.9 | 31.7 |
| 4 | 32.3 | 30.7 |

It may be seen quite clearly that the sizing effect of sizing agents 1 to 4 remains fully intact, even at a pH of 8.0, while the conventional commercial sizing agent K shows only a weak sizing effect at that pH.

APPLICATION EXAMPLE 5

This example demonstrates the suitability of the described sizing agents for the use in pulp.

Quantities of 1 and 2%, by weight, of sizing agent (active substance, based on dry cellulose) are added with stirring to a paper pulp of 50%, by weight, of birch sulphate and 50%, by weight, of pine sulphate cellulose at a pulp density of 0.5%, by weight, and a pH of 6.9.

Immediately afterwards, paper sheets are formed on a laboratory sheet former and dried at 100° C. (weight per unit area approximately 100 g/m²).

The sizing effect is again determined by the water uptake on both sides.

The cationic "sizing agent K" (cf. Application Example 4) is again used for comparison.

TABLE 11

Comparison of sizing agents 1 to 4 with a conventional commercial sizing agent K when used in pulp

| Sizing agent: | water uptake in g/m² after the addition of | |
|---|---|---|
| | 1.0%, by weight, of sizing agent (based on active substance) to the pulp: | 2.0%, by weight, |
| K | 44.6 | 43.2 |
| 1 | 43.8 | 37.7 |
| 2 | 52.0 | 40.5 |
| 3 | 43.0 | 43.0 |
| 4 | 44.6 | 43.1 |

We claim:

1. A method of sizing paper comprising treating the paper with an aqueous 10 to 30% by weight solution of a statistical terpolymer having an average molecular weight of from 10,000 to 70,000 containing quaternized amino groups and having a regular chemical structure of
    (a) from 8 to 20%, by weight of N,N-dimethylaminoethyl acrylate and/or N,N-dimethylaminoethyl methacrylate;
    (b) from 45 to 80% by weight, of styrene; and
    (c) from 8 to 35%, by weight, of acrylonitrile;
the sum of (a) to (c) being 100%, by weight, and at least 10% of the dimethylamino groups of the terpolymer being quaternized and the remainder protonated.

2. The method of claim 1 wherein said terpolymer consists of
    (a) from 8 to 20%, by weight, of N,N-dimethylaminoethyl acrylate and/or N,N-dimethylaminoethyl methacrylate;
    (b) from 55 to 75%, by weight, of styrene; and
    (c) from 10 to 30%, by weight, of acrylonitrile;
the sum of (a) to (c) being 100%, by weight.

3. The method of claim 1 wherein said quaternized dimethylamino groups are quaternized by reaction with propargyl chloride, methyl chloride, methyl bromide, methyl iodide, butyl bromide, dimethyl sulphate, benzyl chloride, p-toluene sulphonic acid methyl ester, chloroacetic acid ethyl ester, allyl chloride, epichlorohydrin, epibromohydrin or methyl epichlorohydrin.

4. The method of claim 1 wherein said non-quaternized dimethylamino groups are protonated by reaction with formic acid, acetic acid, propionic acid, lactic acid, hydrochloric acid, nitric acid, phosphoric acid or sulphuric acid.

* * * * *